United States Patent [19]

Morgan et al.

[11] 4,248,929

[45] Feb. 3, 1981

[54] FILTER MEDIA COATED WITH FLAME RESISTANT COMPOSITIONS

[75] Inventors: Albert W. Morgan, Collinsville, Ill.; Roland G. Ribaudo, Affton, Mo.

[73] Assignee: Monsanto Company, St. Louis, Mo.

[21] Appl. No.: 87,919

[22] Filed: Oct. 24, 1979

Related U.S. Application Data

[62] Division of Ser. No. 901,531, May 1, 1978, Pat. No. 4,196,005.

[51] Int. Cl.$^3$ .................... D04H 1/64; B01D 39/14
[52] U.S. Cl. .................................... 428/288; 55/524; 55/527; 106/18.18; 106/18.16; 252/8.1; 428/289
[58] Field of Search ............. 106/287.29, 18.16, 18.18; 252/88, 8.1; 428/288, 289; 55/524, 527

[56] References Cited

U.S. PATENT DOCUMENTS

| | | | |
|---|---|---|---|
| 1,523,813 | 1/1925 | Lindsay | 428/260 |
| 2,343,186 | 2/1944 | Hopkinson | 106/18.14 |
| 2,357,725 | 9/1944 | Bennett | 260/29.6 MP |
| 2,661,341 | 12/1953 | Nason et al. | 55/524 |
| 3,161,609 | 12/1964 | Graham et al. | 260/17 |
| 3,451,883 | 6/1969 | Plunguian | 106/170 |
| 3,513,644 | 5/1970 | Weil | 55/524 |

*Primary Examiner*—Lorenzo B. Hayes
*Attorney, Agent, or Firm*—George R. Beck

[57] ABSTRACT

Flame resistant articles suitable for filtering solids and liquids from gases comprising a solid filter media, e.g., fiberglass, coated with flame resistant compositions containing liquid aromatic phosphate or polycarboxylate esters and a particulate inorganic phosphate.

12 Claims, No Drawings

FILTER MEDIA COATED WITH FLAME RESISTANT COMPOSITIONS

This is a division, of application Ser. No. 901,531, filed May 1, 1978 now U.S. Pat. No. 4,196,005.

BACKGROUND OF THE INVENTION

Fiberglass and other solid filter media used in air filters, e.g. for circulating air heating systems, diesel engine air intakes and the like, are commonly sprayed with a gelled oil which helps in removal of solids and liquids from the air being filtered. In such filter units, the collected dust and other impurities are often combustible, and the hazards of fires in flowing air systems are well known. To impart flame resistance to filters used in such systems, the gelled oil sprayed on the filter media is generally phosphate ester, e.g. an alkyl diphenyl phosphate. Gelation is typically accomplished by mixing the ester with a high surface area agent such as $SiO_2$ powder or with polymers soluble in the ester. Although substantial flame resistance is achieved by such use of phosphate esters, further improvements in flame resistance are very desirable.

Accordingly, it is an object of this invention to provide compositions which may be deposited on solid filter media (e.g. fiberglass) to enhance the efficiency of such media in filtration of solids or liquids from air or other gases and which, when so deposited, will have a high level of flame resistance. Another object is gas filter means comprising solid filter media having deposited thereon such a composition providing the filter means with good flame resistance. Other objects will be apparent from the following in which, except where otherwise noted, percentages are by weight and temperatures are Celsius.

SUMMARY OF THE INVENTION

In accordance with this invention, the aforesaid objects are achieved using compositions comprising finely divided inorganic phosphate and normally liquid aromatic ester selected from phosphate and polycarboxylate. Desirably, the inorganic phosphate and ester are substantially uniformly distributed throughout the composition in proportions such that the composition is a gel which can be conveniently deposited, e.g. by spraying, on solid gas filter media. Preferred embodiments of such compositions include those consisting essentially of such inorganic phosphate and aromatic ester, e.g. compositions consisting essentially of from about 1 to about 50% inorganic phosphate and from about 50 to about 99% aromatic ester. In general there may be included in such compositions substantial proportions of inexpensive hydrocarbons which enhance filtration efficiency, but without loss of the flame resistance of such compositions. Other of the afore-mentioned objects of this invention are provided by gas filter means comprising solid filter media at least partially coated with such a flame resistant composition.

DESCRIPTION OF PREFERRED EMBODIMENTS

As used herein, the term "flame resistant" is used to characterize materials which, although ignited, do not burn to completion under normal conditions when the source of ignition has been removed. Depending on the nature of the material to be tested, various tests are conventionally used to measure flame resistance. For use with materials employed in air filter media, the "vertical burn" test (Underwriters Laboratory Standard Test UL-94) and the "pill" test (DOC Test No. FF 1) are typically employed. Another test commonly employed is the "match test" in which the ignited head of a common wooden match is pressed firmly against the substance to be tested for a standard length of time and then withdrawn, after which the flame resistance of that substance is evaluated in terms of the length of time for which the substance continues to burn. Conditions of the test are varied in accordance with the nature of the substance to be tested, but as commonly used to evaluate the flame resistance of fibrous air filtration media and referred to hereinafter, the "match test" is carried out by laying a common wooden match centered atop a horizontal 9.2 cm.×18.5 cm.×3.1 cm. piece of fiberglass batting, igniting the match, then forcing the burning horizontally aligned match downward to effect complete compression of the batting, holding the burning match in that position for 15 seconds, withdrawing the match and then measuring the length of time from withdrawal of the match until burning of the batting ceases as evidenced by disappearance of visual flame.

Also as used herein, the term "gel" has the meaning commonly understood in the technical arts to which this invention relates most closely, i.e. a thioxtropic mixture which is non-fluid when not under shear but which becomes fluid when subjected to sufficient shear. Thus, it should be recognized that the term "gel" is not herein used in the sense of a solution of a liquid in a solid. In fact, the compositions of this invention are normally heterogeneous mixtures in which there is little if any solubility of the inorganic phosphate in the aromatic ester or vice versa. Normally the gel compositions of this invention are uniform in appearance to the naked eye and, when not under shear, substantially dimensionally stable over extended periods of time.

In preferred embodiments, the compositions of this invention are sprayable by methods typically used for application of gelled or other oils to gas filter media such as fiberglass or other batting fiber. In one such method, for instance, the composition is air-sprayed using standard industrial equipment (e.g. a Binks spray gun having a gel bottle and a spray nozzle diameter from about 1200 to about 2500 microns) and a line pressure from about 1.3 to about 6.8 atmospheres gage.

The inorganic phosphates useful in this invention are normally solid and have a substantial positive effect on the flame resistance of the compositions in which they are included. Although alkali and alkaline earth metal phosphates may be suitable in some embodiments, those preferably used are ammonium phosphates such as monoammonium phosphate, polyammonium phosphate and, generally most preferred, diammonium phosphate. Mixtures of such inorganic phosphates may also be used if desired.

As used in this invention, such inorganic phosphates are finely divided, i.e. of an average particle size such that they can be conveniently dispersed substantially uniformly throughout a liquid such as the afore-mentioned aromatic ester. Suitable average particle sizes of the inorganic phosphate may vary widely, e.g. with the particular kinds and proportions of aromatic ester and other components, if any, in the composition but in general, such average particle sizes will be from about 0.5 to about 40 microns. Particles too large will detract from stability of the gel, while particles too small will restrict the proportion of inorganic phosphate which can be uniformly dispersed in the composition.

Also included in compositions of this invention is normally liquid essentially halogen-free aromatic ester selected from phosphate and polycarboxylate. By such an aromatic ester is meant a compound containing at least one ester linkage and at least one aromatic radical. Advantageously, such phosphates are di($C_4$–$C_{20}$ alkyl) aryl, $C_4$–$C_{20}$ alkyl diaryl or triaryl phosphates in which each aryl radical is unsubstituted phenyl of $C_1$–$C_{12}$ alkyl phenyl, e.g. diisodecyl phenyl or t-butyl-phenyl phosphate, diundecyl cresyl phosphate, $C_7$–$C_9$ or $C_9$–$C_{11}$ alkyl diphenyl phosphate, isooctyl or isodecyl diphenyl phosphate, 2-ethylhexyl diphenyl or dicresyl phosphate, isononyl dicresyl phosphate, t-butyl-phenyl or isopropyl-phenyl diphenyl phosphate, tricresyl phosphate or triphenyl phosphate. Preferred among those phosphates are the $C_6$–$C_{12}$ alkyl diaryl and triaryl phosphates in which each aryl radical is unsubstituted phenyl or $C_1$–$C_8$ alkyl phenyl, particularly isodecyl diphenyl phosphate and t-butyl-phenyl diphenyl phosphate.

The aromatic polycarboxylates useful in this invention contain at least two ester linkages per molecule and one or more aromatic radicals which may be situated on either or both sides of any given ester linkage, e.g. as in dialkyl phthalates, dibenzyl adipates or benzyl phthalates. Preferred are dicarboxylates such as phthalates, terephthalates, isophthalates, adipates, glutarates, sebacates, pimellates, azelates and succinates. More preferred are the phthalates, including in particular di($C_1$–$C_{20}$ alkyl), $C_1$–$C_{20}$ alkyl benzyl and dibenzyl phthalates, and particularly those in which each alkyl radical contains from about 4 to about 12 carbon atoms, e.g. dibutyl phthalate, dicyclohexyl phthalate, diiosdecyl phthalate, di(2-ethylhexyl)phthalate, diisononyl phthalate, diundecyl phthalate, butyl octyl phthalate, n-octyl decyl phthalate, butyl decyl phthalate, isooctyl isodecyl phthalate, di($C_7$–$C_{11}$ alkyl) phthalate, dioctyl phthalate, dibenzyl phthalate, diphenyl phthalate, and most advantageously in many embodiments, butyl benzyl phthalate, octyl benzyl phthalate, $C_7$–$C_{11}$ alkyl benzyl phthalate, texanol (2,2,4-trimethylpentyl) benzyl phthalates and other $C_4$–$C_{12}$ alkyl benzyl phthalates. Also attractively useful herein are isophthalates and terephthalates such as, e.g. bis(2-ethylhexyl) terephthalate. Preferred among the dicarboxylates of aliphatic dicarboxylic acids are diaryl dicarboxylates such as, e.g. dibenzyl adipate, dicresyl sebacate, etc. Mixtures of such aromatic polycarboxylates and/or phosphates may also be used if desired.

Preferably the afore-described inorganic phosphate and aromatic ester are present in the compositions of this invention in such proportions that when they are substantially uniformly distributed throughout such compositions, the compositions are sprayable gels as described hereinbefore. In general, best results are achieved when, based on the combined weight of such inorganic phosphate and ester in the composition, from about 1 to about 50% is inorganic (preferably ammonium) phosphate and from about 50 to about 99% is ester. In embodiments generally even more preferred, from about 10 to about 40% of the combined weight of inorganic phosphate and ester is inorganic phosphate. When the inorganic phosphate is an ammonium phosphate such as diammonium phosphate, it is even more preferred that the composition contain from about 15 to about 30% of such inorganic phosphate. In other preferred embodiments, the aromatic ester is at least about 5% and generally most desirably at least about 50% phosphate. Thus, in many preferred compositions of this invention, at least about 50% of the combined weight of inorganic phosphate and ester is aromatic phosphate.

Compositions of this invention may contain, in addition to the afore-described inorganic phosphate and aromatic ester, various other constituents including other substances which contribute to the flame resistance of such compositions although, in the preferred embodiments in which such compositions are sprayable gels, such other constituents should be not incompatible with the formation of such gels. Especially preferred embodiments are those consisting essentially of such inorganic phosphate and aromatic ester, i.e. compositions not containing significant proportions of other constituents which contribute to flame resistance of such compositions. However, and whether or not such compositions contain additional constituents contributing to flame resistance, they may contain other components (e.g. colorants, etc) not inconsistent with realization of the objects of this invention. As afore-said, there may be included in such compositions substantial proportions of inexpensive hydrocarbons which enhance the filtration efficiency of filter media at least partially coated with such compositions, but without loss of the flame resistance of such compositions. More specifically, various compositions of this invention may contain hydrocarbons (e.g. paraffins, lube oils or chlorinated paraffins) in substantial concentrations (e.g. from about 5% to about 45% by weight of such compositions) without loss of such flame resistance. This constitutes an important departure from the characteristics of the afore-mentioned gelled oils heretofore used in spraying of air filter media.

In preparation of the preferred embodiments of compositions of this invention in which the inorganic phosphate and aromatic ester are substantially uniformly distributed such that the composition is a sprayable gel, such distribution can be accomplished by various conventional methods, e.g. use of a ball mill, sand mill or intensive (high-shear) mixer. By way of illustration, appropriate proportions of the aromatic ester, inorganic phosphate having an average particle size larger than that desired for the sprayable gel, and any other desired constituents of the composition are fed into a standard ball mill operated preferably with at least 40% air space and a weight of balls equal to or greater than the weight of solid material to be ground. The ball mill is operated normally until the inorganic phosphate is ground sufficiently fine and distributed throughout the ester such that the resulting composition can be sprayed through conventional spray nozzles as described hereinbefore. Normally ball mill operation on the order of 20 rpm for 25 to 100 hours, and even more typically from 36 to 48 hours is sufficient. Operation of the ball mill at room temperature is usually satisfactory, and the size of the balls in the mill is not critical.

Following are specific examples of flame resistant compositions and gas filter means comprising filter media coated therewith in accordance with this invention. These examples are illustrative only and do not imply any limitation on the scope of the invention.

In each of these examples, flame resistance was measured by three tests—match, pill and vertical burn. The match test was carried out as described hereinbefore; results thereof represent the length of time (in seconds)

for which the batting continued to burn with visual flame after withdrawal of the burning match. The pill test was carried out in accordance with DOC Test No. FF 1 in which a methinamine pill of sufficient mass and heat of combustion to simulate a lighted cigarette is laid atop the center of a horizontal 9.2 cm.×18.5 cm.×3.1 cm. piece of fiberglass batting, ignited and allowed to burn completely which takes place in about two minutes; after disappearance of all visual flame, results are obtained by measuring the average diameter of the charred portion of the batting surface on which the pill had burned. The vertical burn test was carried out in accordance with Underwriter Laboratories Standard Test UL-94 (Fed. Spec. CC-5903-191) in which a similar, vertically oriented piece of fiberglass batting is held above a 982° C. Bunsen burner flame 3.8 cm. high with the batting impinging 2.5 cm. into the flame for a measured length of time (5 or 10 seconds); after withdrawal of the flame, results are obtained by measuring the percentage of the vertical length of the batting which has burned.

EXAMPLE I 500 grams of crystalline diammonium phosphate, 1500 grams of isodecyl diphenyl phosphate and 2 pounds of new ¾" porcelain balls were placed in a 3.8-liter ball mill. After continuous operation of the mill at 20 rpm for 74 hours, the phosphates formed a smooth, white, very thixotropic gel referred to hereinafter as Gel A.

EXAMPLE II

The procedure of Example I was duplicated except that butyl benzyl phthalate was substituted for the phosphate ester. The inorganic phosphate and dicarboxylate formed a very fine, creamy, thixotropic gel referred to hereinafter as Gel B.

EXAMPLES III—III

Uniform blends of a hydrogenated hydrocarbon oil and Gel A or a mixture thereof with Gel B were air-sprayed using a standard (Binks) industrial gel bottle spray gun with a spray nozzle diameter of about 2000 microns and a line pressure of about 5.4 atm. gage on a 9.2 cm.×18.5 cm.×3.1 cm. piece of fiberglass batting of a kind conventionally used in air filter systems (urea-formaldehyde binder) and weighing 14 grams. Each piece of batting was then rolled into a tube held with rubber bands, let stand on absorbent paper for 12 hours at 65° C., weighed to determine the amount of flame resistant composition on each, and then subjected to the afore-described tests for measurement of flame resistance. Results are shown in Table A.

TABLE A

| Example | Amount of Gel on Batting, $g/m^2$ | Flame Retardant Composition | | | Match Test, Secs. | Pill Test-Burn Diameter, Cm. | % of Length, Vertical Burn Test (5 Sec) |
|---|---|---|---|---|---|---|---|
| | | % Gel A | % Gel B | % Oil | | | |
| III | 430 | 18.75 | 56.25 | 25 | 0 | 1.9 | 25 |
| IV | 495 | 15 | 45 | 40 | 0 | 1.9 | 46 |
| V | 387 | 22.5 | 67.5 | 10 | 0 | 3.0 | 70 |
| VI | 387 | 20 | 60 | 20 | 0 | 2.5 | 50 |
| VII | 323 | 17.5 | 52.5 | 30 | 0 | 5-7.5 | 30 |

When comparative tests are carried out using $SiO_2$-gelled butyl benzyl phthalate or isodecyl diphenyl phosphate instead of a composition of this invention and depositing as much of the gel as can be retained on the batting, i.e., about 125 $g/m^2$, total burning of the batting occurs.

EXAMPLES IX—XV

Flame resistant compositions containing various proportions of the constituents of Gels A and B were sprayed on fiberglass batting as in Examples III–VII and subjected to the flame resistance tests referred to in Table A. Comparative examples were also carried out using in place of a composition of this invention (A) nothing and (B) an oil consisting of tricresyl phosphate, chlorinated paraffins and liquid hydrocarbons. Results are in Table B:

TABLE B

| Example | Amount of Gel on Batting $g/m^2$ | Flame Retardant Composition | | | Match Test, Secs. | Pill Test-Burn Diameter, Cm. | % of Length, Vertical Burn Test (10 Sec) |
|---|---|---|---|---|---|---|---|
| | | % Gel A | % Gel B | % Oil | | | |
| IX | 60 | 100 | 0 | 0 | 0 | 1.9 | 35 |
| X | 128 | 70 | 0 | 30 | 0 | 3.8 | 25 |
| XI | 162 | 66.7 | 33.3 | 0 | 0 | 1.9 | 20 |
| XII | 350 | 46.7 | 23.3 | 30 | 0 | 3.8 | 15 |
| XIII | 280 | 50 | 50 | 0 | 0 | 1.9 | 10–40 |
| XIV | 104 | 100 | 0 | 0 | 0 | 1.9 | 15 |
| XV | 52 | 0 | 100 | 0 | 0 | 1.9 | 50 |
| A | 0 | 0 | 0 | 0 | 0 | Total Burn | 75 |
| B | 120 | 0 | 0 | 100 | 4 | Total Burn | 100 |

The flame resistant properties of the compositions of this invention will be readily apparent from the foregoing examples. In addition to those advantageous properties, it has been found that exceptionally large amounts of the gel compositions of this invention can be retained on fiberglass batting. For example, it has been found that up to 620 $g/m^2$ and, in some instances, even more of such a gel is retained on fiberglass batting of the type used in Examples III–XV herein, whereas only 120–130 $g/m^2$ of a conventional gelled aromatic phosphate containing no inorganic phosphate is the maximum which can be retained on such batting.

Another discovery made in connection with this invention is that the inclusion of phthalate ester, e.g. butyl benzyl phthalate, in a mixture undergoing milling to produce a gel composition of this invention markedly facilitates such milling. In most instances, however, such a phthalate is preferably not included in such a gel in a concentration substantially greater than about 30% when the gel is to also contain 30% or more hydrocarbon oil.

The flame resistant compositions of this invention have numerous uses in addition to coating of gas filter media. For examples, such compositions have other utilities in which flame resistance is advantageous, e.g. as a spray-on carpet backing.

The foregoing describes preferred embodiments of this invention. However, other embodiments using inorganic phosphates and/or aromatic esters similar to those expressly described herein but differing somewhat therefrom should be considered equivalents thereof to the extent that such differences do not preclude the advantageous properties of the novel compositions disclosed herein. E.g., such other aromatic esters may contain alkyl radicals containing greater or smaller numbers of carbon atoms and/or differently substituted phenyl radicals.

The embodiments of this invention in which an exclusive property or privilege are claimed are defined as follows:

1. An article of manufacture suitable for filtering solids or liquids from a gas and comprising solid filter media at least partially coated with a sprayable, flame resistant gel composition consisting essentially of from about 50 to about 99% normally liquid essentially halogen-free aromatic ester selected from the group consisting of phosphate and polycarboxylate and mixtures thereof and, substantially uniformly dispersed throughout said ester, from about 1 to about 50% finely divided inorganic phosphate, wherein said inorganic phosphate is essentially ammonium phosphate and has an average particle size from about 0.5 to about 40 microns, said aromatic phosphate is selected from di($C_4$–$C_{20}$ alkyl)aryl, $C_4$–$C_{20}$ alkyl diaryl and triaryl phosphates in which each aryl radical is unsubstituted phenyl or $C_1$–$C_{12}$ alkylphenyl, and said polycarboxylate is selected from di($C_1$–$C_{20}$ alkyl), $C_1$–$C_{20}$ alkyl benzyl and dibenzyl phthalates.

2. An article of manufacture of claim 1 wherein the aromatic phosphate is $C_6$–$C_{12}$ alkyl diaryl phosphate in which each aryl radical is unsubstituted phenyl or $C_1$–$C_8$ alkylphenyl and, of the combined weight of said inorganic phosphate and said ester, from about 10 to about 40% is inorganic phosphate.

3. An article of manufacture of claim 1 wherein the polycarboxylate is selected from $C_4$–$C_{12}$ alkyl benzyl phthalates and, of the combined weight of said inorganic phosphate and said ester, at least about 50% is aromatic phosphate.

4. An article of manufacture of claim 1 wherein the inorganic phosphate is essentially diammonium phosphate.

5. An article of manufacture of claim 4 wherein the combined weight of said inorganic phosphate and said ester is from about 55 to about 100% of the weight of said composition.

6. An article of manufacture of claim 5 having a substantial hydrocarbon content up to about 45% by weight of said composition.

7. An article of manufacture of claim 1 containing from about 15 to about 30% diammonium phosphate, at least about 5% of said ester being phosphate.

8. An article of manufacture of claim 7 wherein the polycarboxylate is selected from $C_4$–$C_{12}$ alkyl benzyl phthalates.

9. An article of manufacture of claim 8 wherein the polycarboxylate is predominantly butyl benzyl phthalate.

10. An article of manufacture of claim 1 wherein at least about 50% of said ester is phosphate.

11. An article of manufacture of claim 10 wherein essentially all of said ester is phosphate.

12. An article of manufacture of claim 10 consisting essentially of from about 15 to about 30% diammonium phosphate and from about 70 to about 85% of said ester, at least about 50% of said ester being selected from $C_6$–$C_{12}$ alkyl diaryl and triaryl phosphates in which each aryl radical is unsubstituted phenyl or $C_1$–$C_8$ alkylphenyl, said polycarboxylate being selected from $C_4$–$C_{12}$ alkyl benzyl phthalates.

* * * * *

UNITED STATES PATENT AND TRADEMARK OFFICE
CERTIFICATE OF CORRECTION

PATENT NO. : 4,248,929
DATED : February 3, 1981
INVENTOR(S) : Albert W. Morgan and Roland G. Ribaudo It is certified that error appears in the above-identified patent and that said Letters Patent are hereby corrected as shown below:

Column 3, line 10, "of" should be -- or --.

Column 5, line 63, "EXAMPLES III-III" should read -- EXAMPLES III-VII --.

Column 6, line 18, Table A, under column titled "Pill Test-Burn Diameter, Cm.", "3.0" should be -- 3.8 --.

Signed and Sealed this

Fourteenth Day of April 1981

[SEAL]

Attest:

RENE D. TEGTMEYER

Attesting Officer     Acting Commissioner of Patents and Trademarks